US007918246B2

(12) United States Patent
Stroganov

(10) Patent No.: US 7,918,246 B2
(45) Date of Patent: Apr. 5, 2011

(54) HYDROPNEUMATIC ACCUMULATOR WITH FLEXIBLE POROUS FILLER

(76) Inventor: Alexander A. Stroganov, Saint Petersburg (RU)

( * ) Notice: Subject to any disclaimer, the term of this patent is extended or adjusted under 35 U.S.C. 154(b) by 232 days.

(21) Appl. No.: 12/330,669

(22) Filed: Dec. 9, 2008

(65) Prior Publication Data

US 2010/0050622 A1 Mar. 4, 2010

(30) Foreign Application Priority Data

Sep. 1, 2008 (RU) ................................ 2008135885

(51) Int. Cl.
*F16L 55/04* (2006.01)

(52) U.S. Cl. ............... 138/30; 138/26; 138/31; 220/721

(58) Field of Classification Search .................... 138/26, 138/30, 31; 220/721

See application file for complete search history.

(56) References Cited

U.S. PATENT DOCUMENTS 2,904,077 A * 9/1959 Trumper ......................... 138/30
4,181,155 A * 1/1980 Wesselink et al. .............. 138/30
4,367,786 A * 1/1983 Hafner et al. .................. 165/10

* cited by examiner

*Primary Examiner* — Patrick F Brinson

(74) *Attorney, Agent, or Firm* — Christopher L. Parmelee; Walker & Jocke

(57) ABSTRACT

A hydropneumatic accumulator with a flexible porous filler intended for fluid power recuperation in hydraulic systems with a high level of pulsations includes a shell where a gas port and a fluid port are connected, respectively, with a gas reservoir and a fluid reservoir of variable volume separated by a movable separator. The flexible porous filler fills the gas reservoir so that the separator movement reducing the gas reservoir volume compresses said filler. The filler is connected with internal walls of the gas reservoir with the possibility of stretching the filler at the separator movement increasing the volume of the gas reservoir. The accumulator contains means of protection of the filler boundary layer against rupture made with the possibility of reducing local deformations of the boundary filler layer in case of jerks of the separator. Development of residual deformations of the filler during multiple recuperation cycles and destruction at non-uniform motion of the separator with strong jerks are prevented.

16 Claims, 4 Drawing Sheets

HYDROPNEUMATIC ACCUMULATOR WITH FLEXIBLE POROUS FILLER

Figure 1:
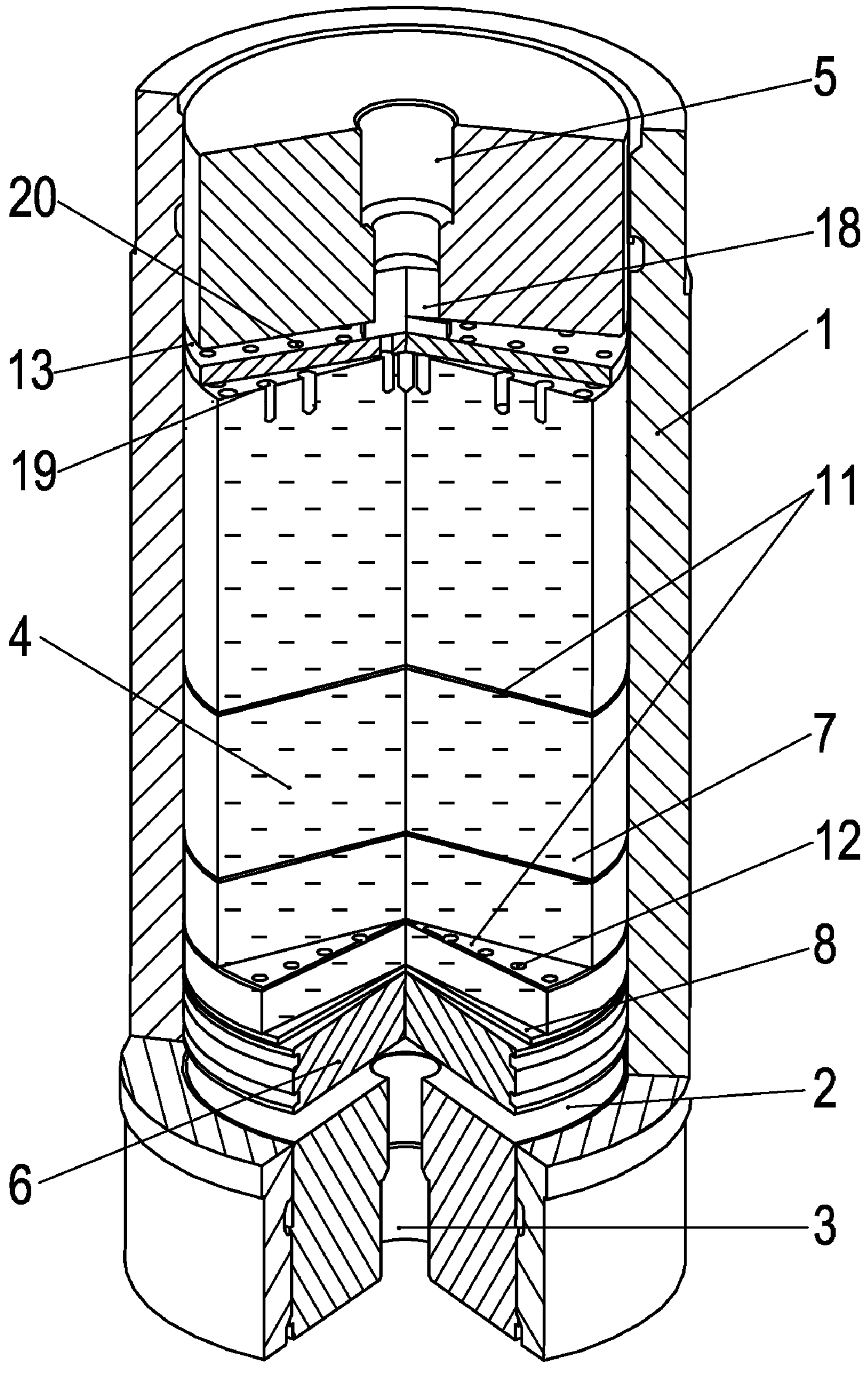

The invention refers to mechanical engineering and can be used for fluid power recuperation in hydraulic systems with high level of fluid flow and pressure pulsations, including systems with a common pressure rail, in hydraulic hybrid cars, in particular those using free-piston engines, as well as in systems with high rate of flow rise and hydraulic shocks, for example, in molding and press-forging equipment.

STATE OF THE ART

A hydropneumatic accumulator (hereinafter—the accumulator) includes a shell containing a gas reservoir of variable volume filled with pressurized gas through a gas port as well as a fluid reservoir of variable volume filled with fluid through a fluid port. These gas and fluid reservoirs are separated by a separator, which is movable relative to the shell. The accumulator is generally charged with nitrogen up to the initial pressure of several to dozens MPa.

For fluid power recuperation accumulators are used both with a solid separator in the form of a piston and with elastic separators, for example, in the form of elastic polymeric membranes or bags [1] and in the form of metal bellows [2]. Accumulators with light polymeric separators smooth pulsations well in the hydraulic system. However, they require more frequent recharge with gas due to the permeability of polymeric separators. A strong jerk of the separator at a high rate of the fluid flow rising from the accumulator (in case of a sharp pressure drop in the hydraulic system, for example) may result in destruction of the polymeric separator. Piston accumulators keep gas better and resist high flow rise rates. However, in case of intensive pulsations in the hydraulic system the piston the vibrating pattern of movement accelerates piston seal wear. In PistoFram accumulators of HydroTrole company [3] the piston contains a chamber divided by the elastic membrane into the gas and fluid parts respectively connected with the gas and fluid reservoirs of the accumulator. At high-frequency pulsations it is not the piston but the light membrane that vibrates preserving the piston seals.

An accumulator generally contains one gas reservoir and one fluid reservoir of variable volume, with equal gas and fluid pressure in them. The accumulator [4] contains one gas reservoir and several fluid reservoirs of variable volume. Their commutation changes the ratio between the gas pressure in the gas reservoir and the fluid pressure in the hydraulic system.

For fluid power recuperation the accumulator is preliminarily charged with the working gas through the gas port and is connected through the fluid port to the hydraulic system. When power is transferred from the hydraulic system to the accumulator, the fluid is pumped from the hydraulic system to the accumulator moving the separator and compressing the working gas in the gas reservoir, while the pressure and temperature of the working gas increase. When the power returns to the hydraulic system from the accumulator, the compressed gas expands moving the separator with decreased volume of the fluid reservoir and forcing fluid out of it into the hydraulic system. The gas pressure and temperature decrease.

Since the distance between the gas reservoir walls is quite big (dozens and hundreds millimeters) the heat exchange between the gas and the walls due to the gas heat conductivity is insignificant. Therefore the processes of gas compression and expansion are essentially non-isothermal with large temperature gradients in the gas reservoir. When the gas pressure rises 2-4 times, the gas temperature rises by dozens and hundreds degrees and convective flows arise in the gas reservoir. This increases heat transfer to the gas reservoir walls dozens and hundreds times. The gas heated during the compression cools down. This results in gas pressure decrease and losses of the stored power that are especially considerable when the stored power is kept in the accumulator. With large temperature differences the heat transfer is irreversible, i.e. the greater part of the heat given up to the walls of the accumulator from the compressed gas cannot be returned to the gas during the expansion. Therefore, the hydraulic system receives back much less hydraulic power during the gas expansion than it was received during the gas compression.

To reduce heat losses in [4], [5], [6], [7] it is suggested to place a compressible regenerator (foamed elastomer) which performs the function of a heat regenerator and insulator into the gas reservoir. In the accumulator according to [7] taken by us as the prototype the accumulator includes a shell in which fluid and gas ports are respectively connected with fluid and gas reservoirs of variable volume separated by a separator movable relative to the shell. The gas reservoir of variable volume contains a flexible porous filler in the form of open-pore elastomer foam filling the gas reservoir so that when fluid is pumped into the accumulator the separator movement reducing the gas reservoir volume compresses the filler, and when the fluid is displaced out of the accumulator the filler expands due to its intrinsic springiness. When compressed the filler takes away some heat from the gas and reduces its heating, and when expanded the filler returns the heat to the gas and reduces its cooling. The small (about 1 mm) size of the filler pores decrease the temperature gradients during the heat exchange between the gas and the filler hundreds of times and increase the heat exchange reversibility during gas compression and expansion considerably. The porous structure of the filler prevents convective heat exchange of the gas with the gas reservoir walls, thus decreasing the heat transfer to the gas reservoir walls and the respective power losses many times. Therefore, practically all the heat given by the gas to the filler during compression is returned to the gas during expansion while the recuperation efficiency increases considerably [5], [6].

The foam thermal capacity can be increased [5] at the expense of the specific melting heat of wax ($T_{melt}$=30-40° C.) that the foam is impregnated with.

A disadvantage of the described solution is the fatigue degradation of the foamed elastomer in case of continuous service resulting in deterioration of its elastic properties and development of residual deformation. As a result, the filler loses its ability to reshape and to fill the entire volume of the gas reservoir while the recuperation efficiency decreases. In the experiments [8] the accumulated residual deformation reaches one quarter of the initial volume of the filler and growing losses of the fluid power in the piston accumulator already within 36000 cycles (400 hours) of slow (0.025 Hz) compression and expansion can be observed. Foam degradation strengthens considerably in real hydraulic systems where due to the high-frequency pulsations the separator moves non-uniformly, with frequent jerks especially strong in hydraulic hybrid cars [9] using strongly intermittent free-piston engines [10] and phase-controlled hydraulic transformers [11] and in hydraulic systems with a common pressure rail. With such a vibrating impact of the jerking separator the boundary layer of the filler adjacent to the separator is exposed to the highest load and destruction. Its springiness is insufficient for acceleration from the separator to be transferred to the entire mass of the filler. If the amplitude of the separator vibration is commensurable with the pore size, the boundary layer is crushed and destroyed, which is followed by destruction of the next layer. A similar destructive impact on boundary layers of the foam is made by hydraulic impacts. Exploitation at increased temperatures typical of mobile applications also accelerates the processes of foam degradation.

Besides, no reliability is ensured in the above-described accumulator during working gas charging and discharging. The cleavage stress of the existing foams is low, about 0.1-1 MPa. During the fast processes of gas charging and discharging considerably larger local pressure drops in the foam may arise, especially near the gas port where the gas flow density is the highest. This will cause foam destruction. During gas charging the foam can be damaged and cavities can form near the gas port. During gas discharging the foam can be entrained by the gas flow into the gas port, which results both in foam losses and formation of cavities and in failure of check and pressure-relief valves of the gas port. Due to the above-described disadvantages the improvement of the recuperation efficiency by filling the gas reservoir with foam that was proposed as far back as 1973 [5] has still not been implemented in industrial production of reliable and durable accumulators.

Essence of the Invention

The object of the invention is prevention of development of residual deformations of the flexible porous filler during multiple cycles of recuperation of fluid power and elimination of the influence of the filler material degradation on recuperation efficiency, prevention of the filler destruction in case of non-uniform movement of the separator with strong jerks, prevention of the filler material destruction and losses and the accumulator gas port damage during working gas charging and discharging as well as longer operating life under increased temperature of the environment and, thus, creation of a long lasting and reliable hydropneumatic accumulator for highly efficient recuperation of fluid power.

To solve the task a hydropneumatic accumulator (hereinafter—the accumulator) is proposed that includes a shell containing a fluid reservoir of variable volume connected with a fluid port and a gas reservoir of variable volume connected with a gas port. These gas and fluid reservoirs are separated by a separator movable relative to the shell. The gas reservoir contains a flexible porous filler (hereinafter—the filler) that fills the gas reservoir so that the separator movement reducing the gas reservoir volume compresses the filler. The task of preventing development of residual deformations of the filler and elimination of the influence of the filler material degradation on the power recuperation efficiency is solved by that the filler is connected with internal walls of the gas reservoir with the possibility of the filler stretching when the separator is moved increasing the gas reservoir volume. Thus, after compression the filler is forced to reshape by using springiness of the compressed gas moving the separator during its expansion, the separator pulling the filler attached to it and stretching it.

To prevent residual deformations contributing to fatigue failure and ruptures in the boundary layer of the filler adjacent to the separator and thus to solve the task of preventing filler destruction in case of non-uniform movement of the separator with strong jerks the accumulator contains means of protection of the filler boundary layer against rupture (hereinafter—means of protection) made with the possibility of reducing local deformations of the filler boundary layer in case of jerks of the separator.

It is preferable to implement these means of protection with the possibility of reducing local deformations of the filler extension down to the values within the prespecified limits of reversible deformations at maximum jerks of the separator.

The prespecified limit of reversible deformations depends on the choice of the porous material of the filler and on the prior deformation of this material corresponding to the maximum volume of the gas reservoir.

The filler is preferably made from foamed elastomer with open pores, for example, foamed polyurethane or foamed latex.

In the embodiment preferred from the point of view of durability the filler is made in such a way that at the maximum volume of the gas reservoir the porous material of the filler should be compressed along the direction of the separator movement to the prespecified degree of precompression below 5. In this case the limit of reversible extension deformations is specified as relative elongation at which the initial size of the pores of the undeformed porous material is restored.

The separator jerk force characterizes the dynamics of the accelerated motion of the separator and determines the load on the filler boundary layer adjacent to the separator when the filler is entrained by the separator into accelerated motion. The higher the separator acceleration and the amplitude of its movement with the acceleration, the higher the jerk force.

The maximum jerk force of the separator can be limited by the operation conditions, for example, by the frequency and amplitude of the pulsations in the hydraulic system. For embodiments of the accumulator preferable for wide application the maximum force of the separator jerks corresponds to the maximum possible rate of the fluid flow rising from the accumulator at the moment of instantaneous drop of pressure in the hydraulic system from the maximum value to the atmospheric pressure.

The invention provides for pneumatic or elastic embodiments of the means of protection as well as their combination.

In pneumatic embodiments the means of protection include at least one gas-dynamic barrier made near the separator transversally to the direction of the separator jerks at a selected distance exceeding the average size of the pores of the filler boundary layer, with the chosen gas permeability along the separator movement smaller than the average gas permeability of the porous material of the filler. The gas dynamic barrier prevents pressure balance between the layers separated by it; the lower the gas permeability of the barrier and the greater the difference between the speed of expansion or compression of these layers, the stronger is the action of said barrier. As the separator jerks become more intensive, the growing pressure drop at the gas dynamic barrier provides higher acceleration of the barrier and the adjacent filler layers, thus reducing the load on the filler boundary layer adjacent to the separator and decreasing its local deformations.

Proposed are gas dynamic barriers of separated embodiment in the form of membranes with holes.

Proposed are also gas dynamic barriers of distributed embodiment made as a set of reduced permeability canals connecting the pores. It is preferable to make the filler with a non-uniform permeability of the canals throughout the volume of the filler, namely with reduced permeability near the separator and increased near the gas port.

In elastic embodiments the means of protection include at least one elastic element connecting the separator with internal layers of the filler that are away from the separator by the chosen depth exceeding the average size of the pores of the filler boundary layer.

Proposed are elastic elements of separated embodiment in the form of elastically extensible polymeric bands or metal springs. In piston accumulators such elastic elements are fixed both on the separator and the shell.

Proposed is also distributed embodiment of elastic elements in the form of reinforced webs between the pores in the boundary layer of the filler wherein the springiness of the reinforced webs is as higher as they are closer to the separator. The webs are reinforced, for example, by reducing the porosity and increasing the density of the porous material in the boundary layer or by introducing more elastic polymeric materials in the pores of the boundary layer.

The tasks of preventing losses of the filler material at working gas discharging as well as increasing the reliability of operation of the gas port of the accumulator are solved by separating the gas port from the filler by a filter made with the possibility to transmit gas into the gas port and not to transmit the filler material into the gas port from the gas reservoir of the accumulator, for example, in the form of a membrane, the average size of its pores not exceeding the average thickness of the webs between the filler pores and the average distance between the membrane pores being less than the average cross dimension of the canals between the filler pores.

The task of preventing filler material damage and losses during gas charging and discharging is solved by that the gas port contains a flow restrictor made with the possibility of restricting the gas flow through the gas port so that the pressure drop in case of an open gas port exceeds, preferably 10 and more times, the maximum pressure difference between different areas of the filler. Proposed are both separate embodiment with a separate flow restrictor in the form of a throttle separated by a filter from the filler and integral embodiment where the filter is made with the above-described possibility of restricting the gas flow, for example, in the form of a three-dimensional solid porous structure with increased gas-dynamic resistance.

In the accumulator embodiment preferable in terms of gas charging and discharging speed the filler near the gas port is made with increased gas permeability exceeding the average permeability of the porous material of the filler, which compensates the increased density of the gas flow near the gas port during gas charging and discharging and decreases the pressure drops in the filler. Proposed are both filler embodiments with separate drainage canals in the filler and distributed embodiments with the filler near the gas port made from porous material with increased sections of canals between the pores.

Proposed are also filler embodiments with increased springiness near the gas port, for example, the filler in this area made from a denser porous material but with increased pore size and sections of canals between them.

To extend the service life of the filler made from foamed elastomer at increased temperature of the environment proposed is an embodiment where the filler contains a material with the phase transition in the temperature range between the maximum temperature of the environment and the maximum permissible temperature of using the filler. For example, the filler is impregnated with hydrocarbons with the melting temperature in the range between 80 and 120 C.

More details of the invention are described in the examples given below and illustrated by the drawings presenting:

FIG. 1—Accumulator with a separator in the form of a piston and pneumatic means of protection; step cut of the sector.

Figure 2:
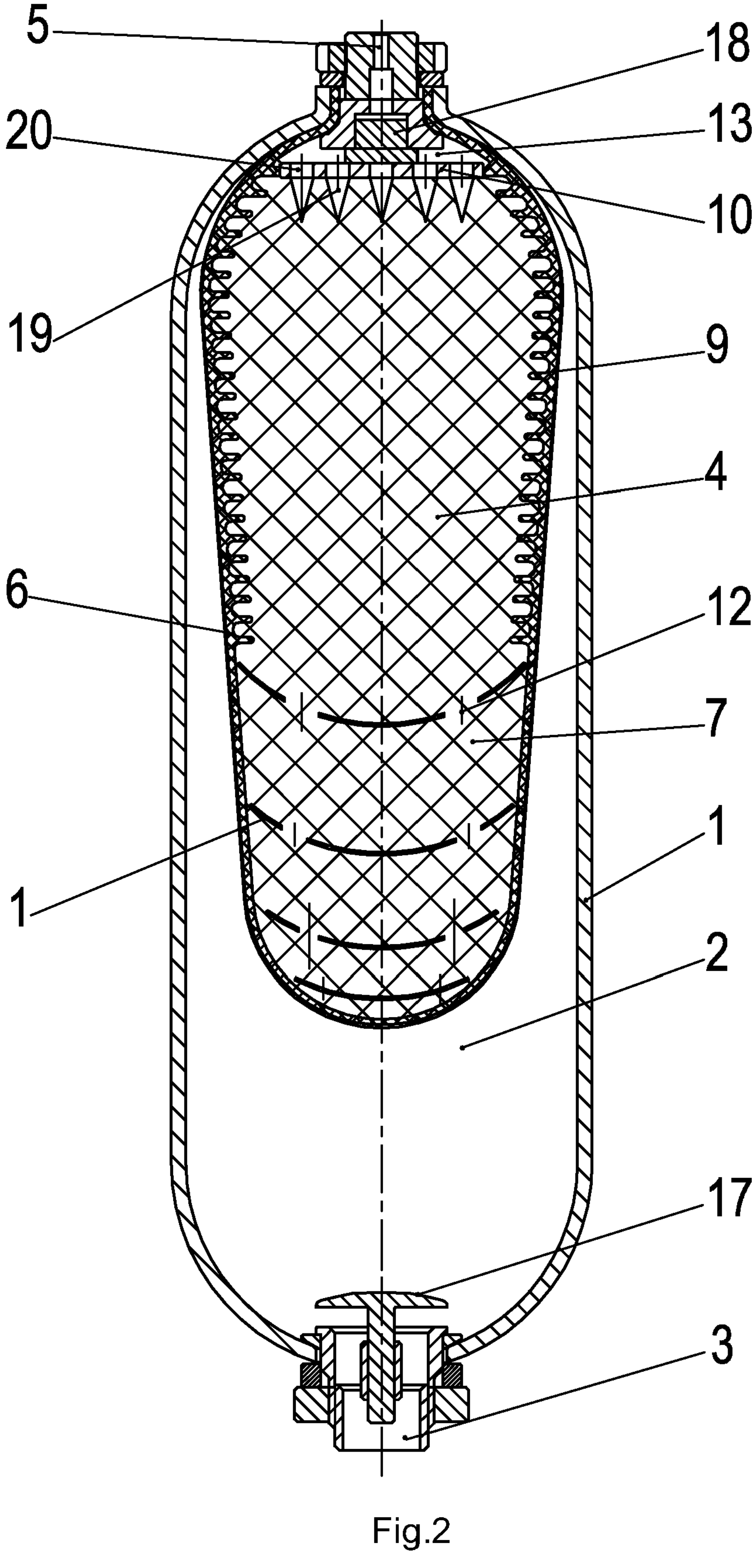

FIG. 2—Accumulator with an elastic separator in the form of a bladder and combined pneumatic and elastic means of protection; axial section.

Figure 3:
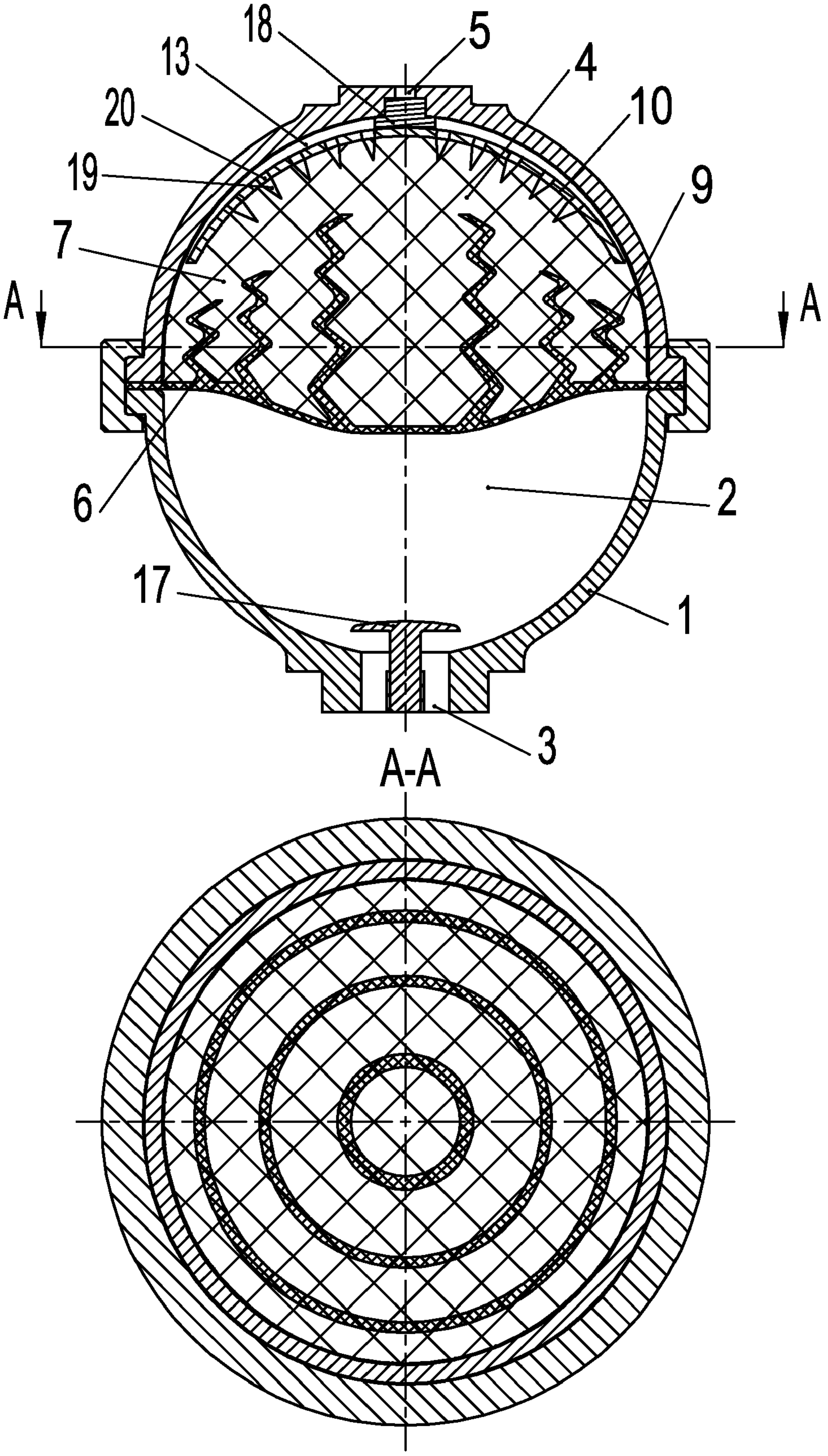

FIG. 3—Accumulator with an elastic separator in the form of a membrane and elastic means of protection; axial section and section in the plane perpendicular to the rotation axis.

Figure 4:
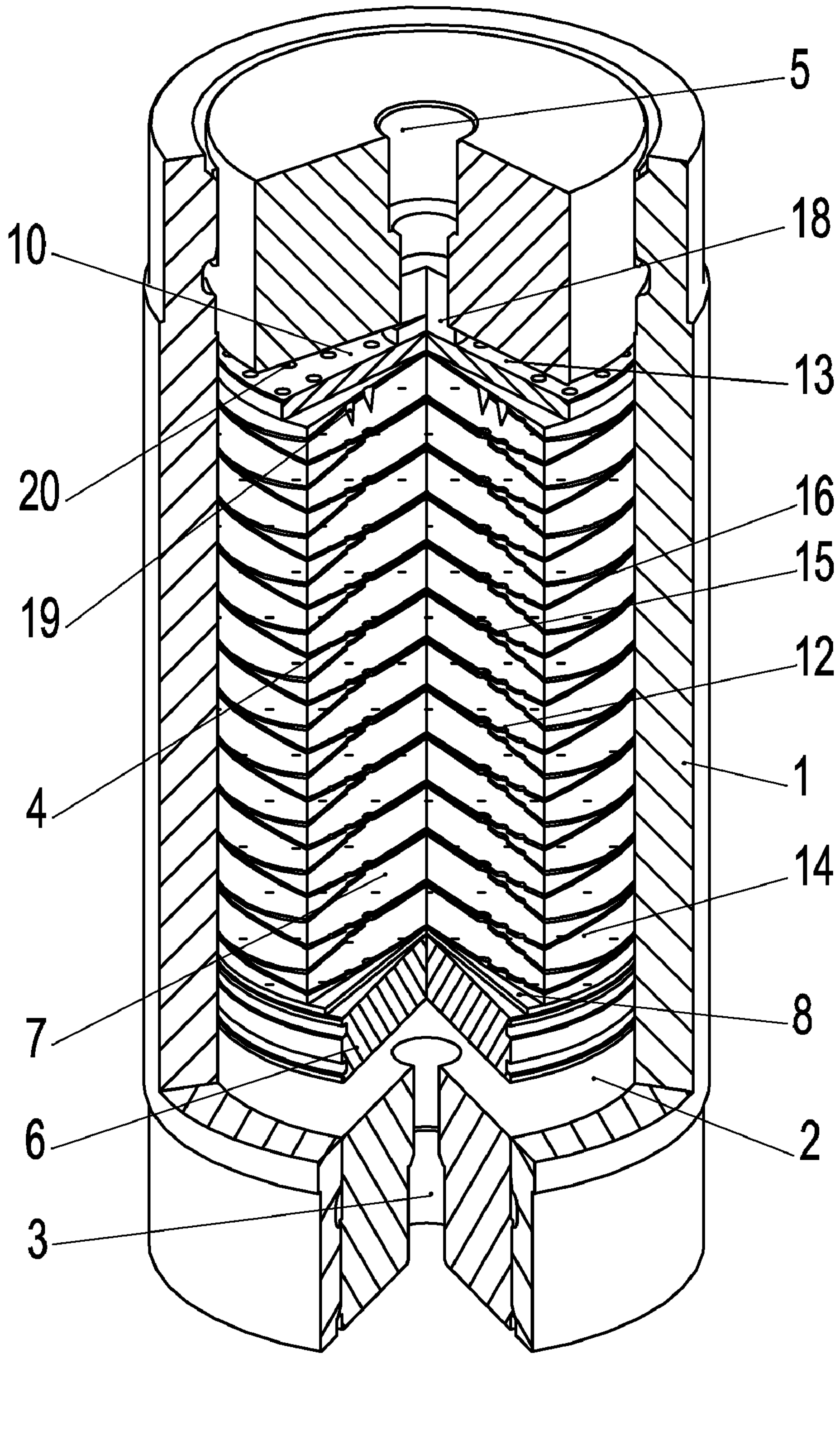

FIG. 4—Accumulator with a separator in the form of a piston and combined pneumatic and elastic means of protection; step cut of the sector.

The hydropneumatic accumulator of FIG. 1-4 include the shell 1 with the fluid reservoir 2 of variable volume connected with the fluid port 3 and the gas reservoir 4 of variable volume connected with the gas port 5. These gas and fluid reservoirs of variable volume are separated by the separator 6. The gas reservoir 4 contains the filler 7 that fills the gas reservoir 4 so that movement of the separator 6 reducing the volume of the gas reservoir 4 compresses the filler 7. The filler 7 is connected with internal walls of the gas reservoir 4, namely with the shell 1 and the separator 6 with the possibility of stretching the filler 7 during movement of the separator 6 increasing the volume of the gas reservoir 4. In the piston accumulators of FIG. 1 and FIG. 4 the filler is glued to the buffer insert 8 installed on the separator 6. In the bladder accumulator of FIG. 2 and in the membrane accumulator of FIG. 3 the filler is glued directly to the elastic separator 6 and the elastic elements 9 connected with it. In all the mentioned accumulators the filler 7 is glued to the shell insert 10 installed on the shell 1.

For fluid power recuperation the accumulator (FIG. 1-4) precharged with gas through the gas port 5 is connected with the hydraulic system via the fluid port 3. During transfer of the power to the accumulator from the hydraulic system the fluid is pumped through the fluid port 3 of the accumulator into its fluid reservoir 2, the separator 6 is moved reducing the volume of the gas reservoir 4 and increasing gas pressure and temperature in it. Gas gives away part of the heat to the filler 7, that reduces the gas heat at compression; due to the small pore size the gas heat exchange with the webs is reversible with small temperature differences between the webs of the pores and the gas in them. During storage of the fluid power stored in the accumulator the heat losses are small as the reduced gas heating reduces the heat transfer to the walls of the shell due to heat conductivity; and due to the porous structure no convective heat transfer arises in the filler to the walls of the shell. When power returns from the accumulator to the hydraulic system, the compressed gas expands and the separator 6 is moved reducing the volume of the fluid reservoir 2 and forcing fluid out of it through the fluid port 3 into the hydraulic system. The separator 6 entrains the filler 7 attached to it ensuring reshaping of the filler and complete filling of the expanding gas reservoir with the porous material of the filler. Since the distances between gas and the pore webs of the filler 7 are kept small the filler effectively returns the received part of the heat to the gas. Thus, the accumulator returns the fluid power received from the hydraulic system back into it practically without any losses while reshaping of the filler 7 in each cycle of recuperation, irrespective of the elastic properties of the material and its degradation, is forced through use of the springiness of the compressed gas moving the separator 6 during its expansion, with the separator 6 pulling the filler 7 attached to it and extending it preventing development of residual deformations.

To prevent redundant deformations contributing to fatigue failures and ruptures in the filler boundary layer adjacent to the separator and thus to solve the problem of preventing filler destruction during the non-uniform motion of the separator with strong jerks the accumulator contains means of protection made with the possibility of reducing local deformations of the filler boundary layer at jerks of the separator. The invention provides for pneumatic or elastic embodiments of the means of protection as well as their combinations. The accumulator of FIG. 1 has pneumatic means of protection, the accumulators of FIG. 3 have elastic means of protection while the accumulators of FIG. 2 and FIG. 4 have combined pneumatic and elastic means of protection.

The means of protection in the piston accumulator of FIG. 1 include gas-dynamic barriers in the form of membranes 11 with holes 12 located transversally to the direction of motion of the separator 6.

The bladder accumulator of FIG. 2 contains combined pneumatic and elastic means of protection. In the zone of small amplitudes of separator movement (i.e. close to the gas port 5) said means of protection are elastic elements 9, their thickness decreasing with depth of penetration into the filler material. The elastic elements 9 are formed on the separator 6 from the same elastic polymeric material as the separator 6 itself. In other embodiments the elastic element can be made in the form of the webs between pores with increased springiness near the separator exceeding the average springiness of the webs between the filler pores. In this case the springiness of the webs in the boundary layer is increased by porosity reduction and density increase of the material of the porous filler or by impregnation it with elastic glue.

In the zone of high amplitudes of the separator 6 movement the filler 7 is also provided with pneumatic means of protection in the form of gas-dynamic barriers made as a set of membranes 11 with holes 12 located transversally to the direction of the separator 6 motion.

The permeability of the membranes 11 in FIG. 1 and FIG. 2 and the distance between them increase as they are more remote from the separator 6. In FIG. 1 the adjacent layers of the porous material of the filler 7 are glued to the membranes 11 made of a polymeric film. In FIG. 2 the layers of the porous material of the filler 7 are glued together by an elastic glue forming the elastic membranes 1 between them.

In the accumulators of FIG. 1 and FIG. 2 the gas-dynamic barriers can be made distributed, namely as a set of canals of reduced permeability connecting the pores of the filler 7. In this case it is preferable to make the filler 7 with non-uniform permeability of its canals throughout its volume, namely reduced near the separator 6 and increased near the gas port 5.

In the membrane accumulator of FIG. 3 the means of protection contain elastic elements 9 in the form of concentric bellows made of an elastic polymeric material so that as the distance from the separator increases, the thickness of the walls of the tubes decreases while the corrugation curvature increases, which ensures smooth decrease of springiness. The filler 7 is glued to the separator 6, to the elastic elements 9 and to the shell insert 10 installed on the shell 1 with the collector gap clearance 13 between them.

In the piston accumulator of FIG. 4 the means of protection include a set of elastic membranes 14 with holes 15 located transversally to the direction of the separator 6 motion and united into a multilayer plate spring 16 attached on the one side to the separator 6 and attached on the other side to the shell 1 via the shell insert 10. The adjacent layers of the porous material of the filler 7 are glued to the elastic membranes 14. The elastic membranes 14 are preferably made from metal and are at the same time both gas-dynamic barriers and elastic elements. Their gas permeability is increased near the gas port 5 due to the diameter of the holes 15 and their quantity increase.

When the accumulator operates as a part of hydraulic system with high frequency pulsation or high flow growth rates and hydraulic impacts the separator 6 moves non-uniformly, with strong jerks causing local deformations of extension or compression of the filler 7 in the boundary layer adjacent to the separator 6. At high rise rate of the fluid flow from the accumulator, for example, due to the sharp pressure drop in the hydraulic system, the separator 6 shoots with a large acceleration towards the fluid port (up in FIG. 1 and FIG. 4, up and sideways in FIG. 2 and FIG. 3) entraining the filler 7 attached to it.

The pneumatic means of protection of FIG. 1, FIG. 2, FIG. 4 work as follows. Due to the high gas-dynamic resistance of the membranes 11 or 14 on each of them there appears underpressure on the side facing the separator 6 and overpressure on the opposite side. The arising pressure drop push each membrane 11 or 14 towards the separator 6 and the membranes entrain the adjacent layers of the filler 7 reducing the load on the boundary layer of the filler and its local stretching deformations distributing the extension into the depth of the filler. The increase of the permeability and distance between the membranes as their distance from the separator increases ensure smooth decrease of the acceleration of the membranes and the connected layers of the porous material of the filler, which ensures uniform distribution of deformations and prevents redundant deformations both in the boundary layer and in the volume of the filler. In a similar manner, when the separator jerks in the opposite direction the pressure drops push the membranes 11 or 14 away from the separator 6, which decreases local compression deformations in the boundary layer.

Elastic means of protection of FIG. 2-4 work as follows. When the separator moves non-uniformly, with strong jerks, the elastic elements of the accumulator entrain the adjacent layers of the porous material of the filler in accelerated motion distributing the acceleration and respective inertia loads and deformations deeper into the filler thus reducing local deformations of its boundary layer. The decrease of springiness of the elastic elements 9 with increase of the distance from the separator as shown in FIG. 2, FIG. 3, or connection of the elastic element with the shell in the form of a multilayer plate spring 16 as shown in FIG. 4, ensure smooth decrease of the accelerations of the connected layers of the porous material of the filler, which ensures uniform distribution of deformations and prevents redundant deformations both in the boundary layer and in the volume of the filler.

In all the embodiments given above it is preferable to provide the means of protection with the possibility of reducing local deformations of the filler extension down to the values not exceeding the prespecified limits of reversible deformations at maximum jerks of the separator.

The maximum jerk force of the separator 6 can be restricted by the operation conditions. For example, if the accumulator is to be used in a hydraulic hybrid car with a free piston engine, the working volume and maximum frequency of the engine displacement strokes determine the maximum acceleration and amplitude of the separator movements and the maximum force of its jerks. When the accumulator works with several pulsating sources and loads, for example, in a common pressure rail, the maximum jerk force is determined as the total of all sources and loads.

For a general purpose accumulator it is preferable to determine the acceleration and amplitude of accelerated movement of the separator and its maximum jerk force through the maximum possible rise rate of the fluid flow from the accumulator at instantaneous pressure drop in the hydraulic system from the maximum to the atmospheric pressure.

The maximum rise rate of the fluid flow from the accumulator is determined, first of all, by the hydrodynamic characteristics of its fluid port 3. In the accumulators of FIG. 2 and FIG. 3 the fluid port 3 contains a poppet valve 17 restricting the fluid flow and its rise rate, which decreases the maximum jerk force of the separator. In the membrane accumulator of FIG. 3 the fluid port 3 with the poppet valve 17 is made with such level of the fluid flow restriction that allows to implement nothing more than elastic means of protection.

The prespecified limit of reversible transformations depends on the choice of the porous material of the filler and on preliminary deformation of this material corresponding to the maximum volume of the gas reservoir.

The preferred filler is made from foamed open-pore elastomer, for example, foamed polyurethane or foamed latex, with pores from tenths of a millimeter to few millimeters. From the point of view of durability the filler is preferably made so that at the maximum volume of the gas reservoir the porous material of the filler is compressed along the direction of the separator movement at the prespecified degree of precompression below 5, while the limit of reversible deformations is specified as relative elongation at which the initial size of the pores of the undeformed porous material is restored. For example, if the degree of precompression for a filler with the pore size of 1 mm is chosen to equal 1.8, the gas charging pressure is 9 MPa, at the minimum pressure in the hydraulic system of 10 MPa the pores can be extended twice (from 0.5 to 1 mm) and at the pressure of 25 MPa—up to 5 times (from 0.2 to 1 mm). The extension of the compressed pores up to the size not exceeding the initial size saves the pore webs from irreversible cyclic extension, thinning and rupture.

Based on the prespecified limits of reversible deformations and the maximum force of jerks of the separator with the known density and springiness of the porous material of the filler, the quantity, shapes and layout of the gas-dynamic barriers or elastic elements is chosen as well as their permeability or springiness, respectively. Stronger jerks of the separator and lower limits of reversible deformations require more gas-dynamic barriers or elastic elements with less thickness of the layers between them; provided that the gas-dynamic barriers have lower permeability while elastic elements have higher springiness near the separator and greater depth of penetration of the elastic elements into the filler.

Thus, at any jerks of the separator there arises no irreversible local stretching of the porous material of the filler that prevents its destruction.

To prevent damage and losses of the filler material at gas charging and discharging and to increase the reliability of operation of the gas port in the accumulators of FIG. 1-4 the filter 18 is installed between the shell insert 10 and the gas port 5. The filter is made from a porous material with the possibility to transmit gas and to trap the filler material and to limit the gas flow at its charging and discharging so that its pressure drop with the open gas port 10 and more times exceeds the maximum pressure difference between different areas of the filler. It is also possible to provide embodiments with a separate restrictor of the gas flow in the form of a throttle separated from the filler by a filter made with the possibility to transmit gas and not to transmit the filler material into the gas port from the gas reservoir of the accumulator, for example, in the form of a membrane, the average size of its pores not exceeding the average thickness of the webs between the filler pores and the average distance between the membrane pores being less than the average cross dimension of the canals between the filler pores.

To increase the gas permeability near the gas port 5 in the filler 7 there are drainage canals 19, their section decreasing as they go deeper into the filler material. Through the holes 20 in the shell insert 10 the drainage canals communicate with the filter 18 either directly or via the collector gap clearance 13.

In all the said accumulators proposed is also a distributed embodiment of the drainage canals 19, with the filler 7 near the gas port 5 made from a porous material with increased sections of canals between the pores.

In all the mentioned accumulators the preferred filler has higher springiness near the gas port 5, namely it is made from a denser porous material but with increased pore size and sections of canals between them.

Restriction of the gas flow at charging and discharging reduces the total pressure drop between different parts of the filler while the drainage canals 19 together with the holes 20 in the shell insert 10 and the collector gap clearance 13 between it and the shell 1 uniformly distribute internal gas flows and the corresponding pressure gradients preventing destruction of the porous material of the filler near the gas port. The increased springiness of the filler material near the gas port allows discharging and charging at a higher speed. During gas discharging the filter 18 retains the porous material of the filler preventing it from being entrained into the gas port and ensuring long service of the filler and reliability of the gas port.

The accumulator may have an additional gas port of emergency release. In this case the additional gas port is provided with the same means of preventing filler material damage and losses as the main gas port.

In the piston accumulators (FIG. 1, 4) the means of protection also provide for prevention of twisting of the filler 7 both during assembly of the accumulator and at turns of the separator 6 that are possible during its movement. Twisting is prevented, for example, by the possibility of rotation of the buffer insert 8 or shell 10 insert relative to the separator 6 or the shell 1, respectively.

Piston accumulators can have a piston with a chamber and a membrane in it dividing the chamber into a fluid part and a gas part communicating with the fluid reservoir and gas reservoir, respectively, through windows in the piston. In such embodiments the filler has higher springiness and permeability near the piston windows, that ensures preservation of the filler material and good gas exchange between the chamber and the gas reservoir at fluctuations of the membrane.

To extend the service life at increased temperature of the environment any of the accumulators mentioned is preferably made with the filler containing a material with the phase transition in the temperature range between the maximum temperature of the environment and the maximum permissible temperature of using the filler. For example, the filler is impregnated with hydrocarbons with the melting temperature range between 80 and 120 C. At high temperatures of the environment, for example, at 40-60 C, the temperature of the gas and the filler during compression grows until it reaches the temperature of the phase transition. After that the melting hydrocarbons absorb a large amount of heat reducing the heat degree and preventing temperatures dangerous for the filler material.

Thus, the proposed solutions:

prevent destruction and degradation of the porous material of the heat insulation filler during operation of a hydro-pneumatic accumulator in a hydraulic system with high rates of flow rise and hydraulic shocks causing strong jerks of the separator;

ensure protection of the filler material against destruction and losses and protection of the gas port of the accumulator from damage at working gas charging and discharging; as a result the proposed accumulator has high efficiency, reliability and long service life, even at increased temperatures.

The embodiments described above are examples of implementation of the main idea of the present invention that also contemplates a variety of other embodiments that have not been described here in detail, for example, embodiments of accumulators containing one gas reservoir and several fluid reservoirs of variable volume in one shell.

CITED LITERATURE

1—L. S. Stolbov, A. D. Petrova, O. V. Lozhkin. Fundamentals of hydraulics and hydraulic drive of machines". Moscow, "Mashinostroenie", 1988, p. 172
2—U.S. Pat. No. 6,405,760
3—http://www.hydrotrole.co.uk/
4—U.S. Pat. No. 5,971,027
5—Otis D. R., "Thermal Losses in Gas-Charged Hydraulic Accumulators", Proceedings of the Eighth Intersociety Energy Conversion Engineering Conference, August 1973, pp. 198-201
6—Pourmovahed A., S. A Baum, F. J. Fronczak, N. H. Beachley "Experimental Evaluation of Hydraulic Accumulator Efficiency With and Without Elastomeric Foam", Proceedings of the Twenty-second Intersociety Energy Conversion Engineering Conference, Philadelphia, Pa., Aug. 10-14, 1987, paper 87-9090
7—U.S. Pat. No. 7,108,016
8—Pourmovahed A., "Durability Testing of an Elastomeric Foam for Use in Hydraulic Accumulators", Proceedings of the Twenty-third Intersociety Energy Conversion Engineering Conference, Denver, Colo., Jul. 31-Aug. 5, 1988. Volume 2 (A89-15176 04-44)
9—Peter A. J. Achten, "Changing the Paradigm", Proceedings of the Tenth Scandinavian International Conference on Fluid Power, May 21-23, 2007, Tampere, Finland, Vol. 3, pp. 233-248
10—Peter A. J. Achten, Joop H. E. Somhorst, Robert F. van Kuilenburg, Johan P. J. van den Oever, Jeroen Potma "CPR for the hydraulic industry: The new design of the Innas Free Piston Engine", Hydraulikdagarna'99, May 18-19, Linköping University, Sweden
11—Peter A. J. Achten, "Dedicated Design of the Hydraulic Transformer", Proceedings of the IFK 3, Vol. 2, IFAS Aachen, pp. 233-248

The invention claimed is:

1. A hydropneumatic accumulator with a flexible porous filler including a shell with a fluid reservoir of variable volume connected with a fluid port and a gas reservoir of variable volume connected with a gas port, wherein the gas and fluid reservoirs of variable volume are separated by a separator movable relative to the shell, and the gas reservoir contains a flexible porous filler filling the gas reservoir so that the separator movement reducing the gas reservoir volume compresses the filler, wherein the filler is connected with internal walls of the gas reservoir so that during the separator movement increasing the volume of the gas reservoir the filler is stretched, wherein the filler contains a means of protecting a filler boundary layer adjacent to the separator, which means is made so as to reduce local deformations of the filler boundary layer adjacent to the separator in case of jerks of the separator.

2. The accumulator according to claim 1 wherein the means of protecting the filler boundary layer adjacent to the separator is made so as to reduce local deformations of the filler extension down to values not exceeding a limit of reversible deformations of the filler at maximal jerks of the separator.

3. The accumulator according to claim 2 wherein the filler is made so that at a maximum volume of the gas reservoir the porous material of the filler is compressed along a direction of the separator movement to a prespecified degree of precompression while said limit of reversible extension deformations of the filler is set as relative elongation at which an initial size of the pores of the undeformed porous material of the filler is restored.

4. The accumulator according to claim 2 wherein a force of said maximal jerks of the separator is determined by a maximum possible rate of a fluid flow rising from the fluid reservoir that may arise at instantaneous pressure drop in a hydraulic system connected to the accumulator from a maximum to an atmospheric pressure.

5. The accumulator according to claim 1 wherein the means of protecting the filler boundary layer adjacent to the separator include at least one gas-dynamic barrier made near the separator transversally to a direction of separator jerks at a chosen distance exceeding an average size of the pores of the porous material of the filler boundary layer adjacent to the separator, and wherein the gas-dynamic barrier is made with chosen gas permeability along the separator movement smaller than an average gas permeability of the porous material of the filler.

6. The accumulator according to claim 5 wherein the gas-dynamic barrier is made in a form of a membrane with holes.

7. The accumulator according to claim 5 wherein the gas dynamic barrier is made as a set of canals connecting the pores, which canals have reduced permeability near the separator.

8. The accumulator according to claim 1 wherein the means of protecting the filler boundary layer adjacent to the separator includes at least one elastic element connecting the separator with internal layers of the filler that are away from the separator by chosen depth exceeding an average size of the pores of the porous material of the filler boundary layer adjacent to the separator.

9. The accumulator according to claim 8 wherein the separator and the elastic element are made from a same elastic material.

10. The accumulator according to claim 8 wherein the separator is made in a form of a piston while the elastic element is made in a form of a metal spring connected with the separator and the shell of the accumulator.

11. The accumulator according to claim 8 wherein the elastic element is made as a set of walls between the pores with increased springiness near the separator exceeding an average springiness of webs between the pores.

12. A hydropneumatic accumulator with a flexible porous filler including a shell with a fluid reservoir of variable volume connected with a fluid port and a gas reservoir of variable volume connected with a gas port, wherein the gas and fluid reservoirs of variable volume are separated by a separator movable relative to the shell, and the gas reservoir contains a flexible porous filler filling the gas reservoir so that the separator movement reducing the gas reservoir volume compresses the filler, wherein the filler is connected with internal walls of the gas reservoir so that during the separator movement increasing the volume of the gas reservoir the filler is stretched, wherein the gas port is separated from the filler by a filter that is operative to transmit gas from the gas reservoir into the gas port and to trap the filler material.

13. A hydropneumatic accumulator with a flexible porous filler including a shell with a fluid reservoir of variable volume connected with a fluid port and a gas reservoir of variable volume connected with a gas port, wherein the gas and fluid reservoirs of variable volume are separated by a separator movable relative to the shell, and the gas reservoir contains a flexible porous filler filling the gas reservoir so that the separator movement reducing the gas reservoir volume compresses the filler, wherein the filler is connected with internal walls of the gas reservoir so that during the separator movement increasing the volume of the gas reservoir the filler is stretched, wherein the gas port contains a flow restrictor restricting the gas flow through the gas port so that a pressure drop on the flow restrictor with an open gas port exceeds, preferably 10 and more times, a maximum pressure difference between different spaces of the filler.

14. A hydropneumatic accumulator with a flexible porous filler including a shell with a fluid reservoir of variable volume connected with a fluid port and a gas reservoir of variable volume connected with a gas port, wherein the gas and fluid reservoirs of variable volume are separated by a separator movable relative to the shell, and the gas reservoir contains a flexible porous filler filling the gas reservoir so that the separator movement reducing the gas reservoir volume compresses the filler, wherein the filler is connected with internal walls of the gas reservoir so that during the separator movement increasing the volume of the gas reservoir the filler is stretched, wherein the filler near the gas port is made with increased gas permeability exceeding an average permeability of the porous material of the filler.

15. A hydropneumatic accumulator with a flexible porous filler including a shell with a fluid reservoir of variable volume connected with a fluid port and a gas reservoir of variable volume connected with a gas port, wherein the gas and fluid reservoirs of variable volume are separated by a separator movable relative to the shell, and the gas reservoir contains a flexible porous filler filling the gas reservoir so that the separator movement reducing the gas reservoir volume compresses the filler, wherein the filler is connected with internal walls of the gas reservoir so that during the separator movement increasing the volume of the gas reservoir the filler is stretched, wherein the filler is made with increased springiness near the gas port.

16. The accumulator according to claim 1 wherein the filler contains a material with a phase transition in a temperature range between a maximum temperature of an environment and a maximum permissible temperature of using the filler.

* * * * *